United States Patent [19]

Loose et al.

[11] Patent Number: 4,762,668

[45] Date of Patent: Aug. 9, 1988

[54] VENTURI FLOW NOZZLE ULTRASONIC CLEANING DEVICE

[75] Inventors: Robert A. Loose, Murrysville Boro; William R. Rice, Monroeville Boro, both of Pa.

[73] Assignee: Westinghouse Electric Corp., Pittsburgh, Pa.

[21] Appl. No.: 106,962

[22] Filed: Oct. 9, 1987

Related U.S. Application Data

[63] Continuation-in-part of Ser. No. 855,265, Apr. 24, 1986, abandoned.

[51] Int. Cl.⁴ .......................... G21C 19/32; B08B 3/12
[52] U.S. Cl. ...................... 376/310; 376/246; 15/104.07; 134/1; 239/106; 310/323; 310/26; 406/194
[58] Field of Search .................... 134/1; 376/310, 246; 310/323, 26, 328; 239/106; 406/194; 15/104.07

[56] References Cited

U.S. PATENT DOCUMENTS

| | | | |
|---|---|---|---|
| 3,198,489 | 8/1965 | Finch | 259/1 |
| 3,601,084 | 8/1971 | Biro et al. | 116/137 A |
| 4,320,528 | 3/1982 | Scharton et al. | 376/310 |
| 4,691,724 | 9/1987 | Garcia et al. | 134/1 X |

FOREIGN PATENT DOCUMENTS 3046061  6/1982  Fed. Rep. of Germany .

Primary Examiner—John F. Terapane
Assistant Examiner—John S. Maples
Attorney, Agent, or Firm—D. C. Abeles

[57] ABSTRACT

An ultrasonic cleaning device for a venturi flow nozzle in a pipe in a fluid system which includes one more transducer assemblies for generating and transmitting sound waves to the nozzle to effect a cleaning action.

32 Claims, 7 Drawing Sheets

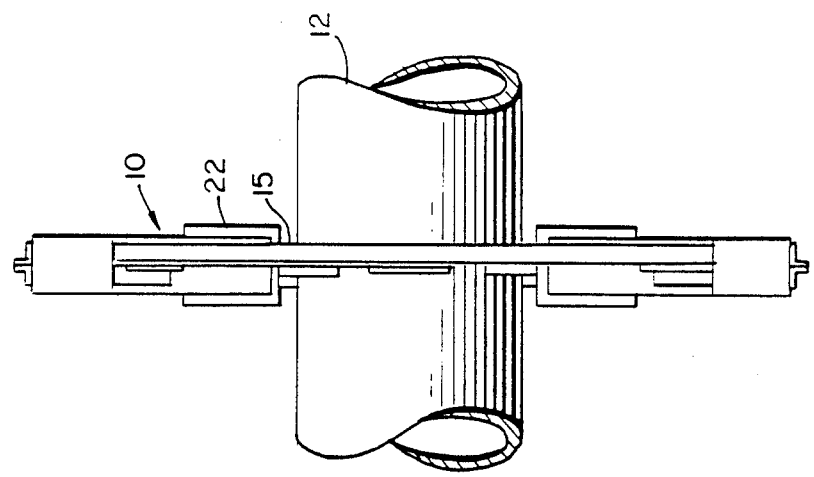

VENTURI FLOW NOZZLE ULTRASONIC CLEANING DEVICE

This application is a continuation-in-part, of application Ser. No. 06/855,265 filed Apr. 24, 1986, now abandoned.

BACKGROUND OF THE INVENTION

1. Field of the Invention

This invention relates to an ultrasonic device for cleaning a venturi flow nozzle mounted in a pipe in a fluid system whereby the nozzle may be cleaned on line without requiring the system to be shut down.

2. Description of the Prior Art

In operation of many industrial plants employing fluid systems having venturi flow nozzles therein, fouling of the venturi flow nozzles, particularly at or near the throat, occurs causing the flow indication to be higher than the actual or calibrated flow value. In these circumstances, the flow rate is less than actually indicated, and consequently, the output for the plant is reduced. This is particularly true in connection with pressurized water nuclear powered electric generating plants which employ venturi flow nozzles in the main feedwater pipe to measure the flow rate of the feedwater to the steam generator. In such plants, following the secondary side calorimetric and adjustment of the Nuclear Instrumentation System, indicated power is higher than the actual reactor power, and the plant thus operates below its licensed thermal limit. Because of this, the electrical output on such plants can fall short of its rated limit by as much as four percent, which in some plants can amount to 40 megawatts.

While various means have been tried for correcting the problem of fouling of venturi flow nozzles, none have proved totally satisfactory. For example, one solution has been to install a handhole upstream of the venturi flow nozzle and manually insert a jet spray nozzle through the handhole to hose off and remove deposits for fouling on the inner surface of the venturi. This particular solution requires a plant shutdown and pipe drainage which is expensive and time consuming. Another solution has been to install leading edge flow meters which are not subject to fouling. Installation of such leading edge flow meters, however, can be expensive.

At the present time, numerous utilities with nuclear power plants, in particular, are trying to find solutions to recovering lost megawatts due to feedwater venturi flow nozzle fouling. In view of the fact that a good solution to the fouling problem presently does not exist, such utilities are reluctant to implement any solutions, and consequently, they continue to lose megawatt output which is very costly.

Accordingly, a need still exists for an economical device capable of easily cleaning venturi flow nozzles which is relatively inexpensive and easy to install and which does not require plant shutdown and pipe drainage.

SUMMARY OF THE INVENTION

Accordingly, it is an object of the present invention to provide an ultrasonic cleaning device for venturi flow nozzles which can be operated on line and does not require plant shutdown.

It is another object of the present invention to provide an ultrasonic device for cleaning venturi flow nozzles which is automatic in operation and therefore does not have to be operated manually.

It is still another object of the present invention to provide an ultrasonic cleaning device for venturi flow nozzles which is relatively inexpensive, easy to install and is essentially maintenance free.

To achieve the foregoing and other objects of the present invention, and in accordance with the purpose of the invention, there is provided an ultrasonic cleaning device for a venturi flow nozzle mounted in a pipe in a fluid system which includes one or more transducer assemblies mounted around a pipe for producing and transmitting sound waves to the throat of the venturi flow nozzle. The transducer assemblies may be mounted on a plate mounted around the pipe. Each transducer assembly includes a transducer for generating sound waves, a horn attached to the transducer for concentrating the sound waves and a rod connected at one end to the horn and extending through an opening into the pipe so that the other end of the rod contacts the nozzle to transmit the sound waves thereto.

The device further includes a guiding and sealing assembly for each rod which is attached to the pipe around each opening. Each guiding and sealing assembly includes a base member and a cover member, each having a central opening therein through which the rod passes, and sealing means surrounding the rod. In one of the embodiments the sealing means includes packing rings around the rod, while in another embodiment the sealing means includes a bellows surrounding the rod. The guiding and sealing assembly further may include spring means for biasing the rod towards the nozzle.

In another embodiment of the invention, there is provided an ultrasonic cleaning device for a venturi flow nozzle mounted in a pipe in a fluid system which includes one or more transducers positioned adjacent the nozzle in the pipe for producing and transmitting sound waves to the nozzle. A mounting and sealing assembly is mounted in an opening in the pipe for each transducer for maintaining the transducer in position adjacent the nozzle and for sealing the opening. The mounting and sealing assembly includes a fitting threadably mounted in the pipe opening and spring means for biasing the transducer towards the nozzle. The transducer may include a threaded portion at one end for connection to the nozzle. In another embodiment, the mounting and sealing assembly includes a base member attached to the pipe and has a central opening therein in alignment with the pipe opening and wherein at least a portion of the fitting is threadably engaged with the base member.

These, together with other objects and advantages, which subsequently will be apparent, reside in the details of construction and operation of the invention as more fully hereinafter described and claimed, reference being made to the accompanying drawings forming a part hereof wherein like numerals refer to like parts throughout.

BRIEF DESCRIPTION OF THE DRAWINGS

FIG. 1 is front elevational view, partially in cross-section, showing the ultrasonic cleaning device of the present invention as including four transducer assemblies.

FIG. 2 is a side elevational view of the ultrasonic cleaning device of the present invention shown in FIG. 1.

DETAILED DESCRIPTION OF THE PREFERRED EMBODIMENTS

Figure 3:
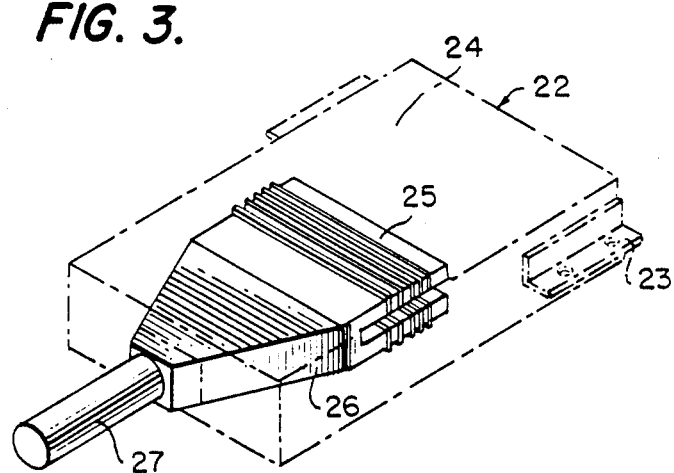
FIG. 3. is a perspective view of one of the transducer assemblies of the present invention mounted in a cover shown in dotted lines.

Referring to the drawings, shown in FIGS. 1 and 2 is an ultrasonic cleaning device, generally indicated by the numeral 10, mounted around a pipe 12 of a fluid system for cleaning a venturi flow nozzle 14 mounted within the pipe. The cleaning device includes a plate 15 which is split into two sections 16 and 17 for ease of installation around the pipe 12. The plate sections 16 and 17 are fastened together and secured to the pipe by suitable bracket or clamp means 18. Mounted on the edges of the plate 10 are a plurality of brackets 19 adapted to be attached to suitable support structure (not shown) to further hold the cleaning device in position.

A plurality of transducer assemblies 22 are mounted on plate 10 by a suitable means such as brackets 23 which may be bolted to the plate. The transducer assemblies generate and transmit sound waves. In the embodiment shown in FIG. 1, four such transducer assemblies 22 are shown spaced 90° from each other around the circumference of pipe 12. A suitable transducer assembly is manufactured by Swen Sonic Corporation and is designated as a Sonic Horn Assembly, 10 kHz, No. 101032.

As best shown in FIG. 3, each transducer assembly 22 includes a cover 24 having mounting brackets 23 thereon. The cover 24 encloses a transducer 25 for generating sound waves and preferably is comprised of a series of U-shaped nickel laminations assembled into a single unit with electrical coils surrounding each leg of the U-shaped configuration. The cover functions to deaden the sound waves. Attached to the bottom of the U-shaped configuration by suitable means such as silver brazing, is a horn 26 preferably constructed of solid stainless steel. The horn functions to concentrate the sound waves generated by the transducer and transmit them to an extension rod 27 formed of a suitable material such as stainless steel. In the embodiment shown in FIG. 3, the horn is shown with straight sides tapering inwardly from the transducer to the rod 27. The horn, however, may have other configurations such as stepped sides narrowing to the rod or be formed in the general shape of a parabolic curve. The rod 27 preferably is threadably attached to the horn 26 by means of a threaded extension or portion 28 formed at one end of the rod.

As most clearly shown in FIGS. 6–9, the pipe 12 is provided with an opening or hole 30 to accommodate the rod 27 of each transducer assembly employed. A guiding and sealing assembly, generally indicated by the numeral 32, is provided for each rod and is rigidly secured by suitable means such as welds 33 to the pipe 12 around each pipe opening 30. Rather than being supported by plate 15, each transducer assembly 22 may be supported solely by a guiding and sealing assembly 32.

Figure 6:
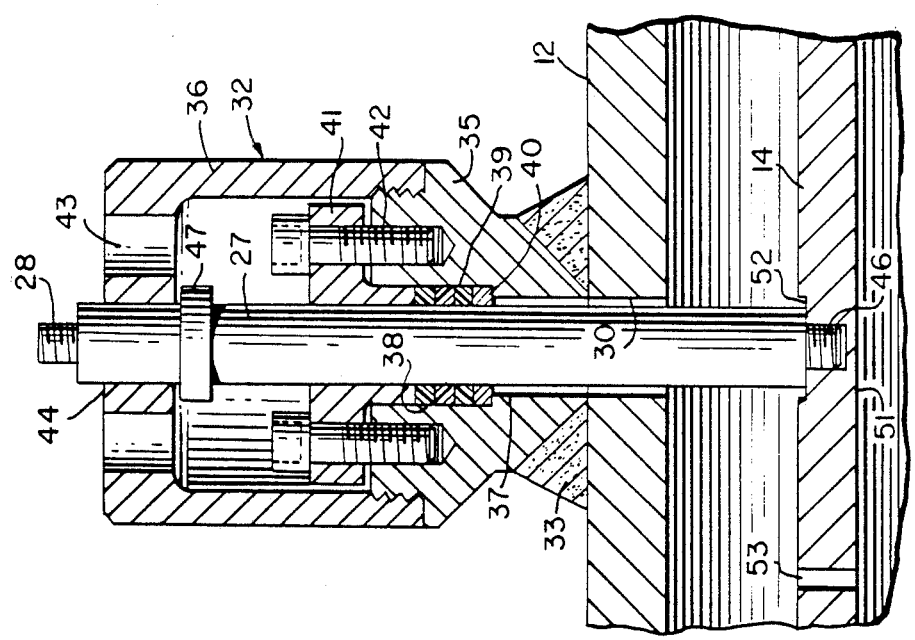
FIG. 6 is a cross-sectional view taken along line 6—6 of FIG. 1 showing one embodiment of the guiding and sealing assembly for the rod of the ultrasonic cleaning device of the present invention.

In the embodiment shown in FIG. 6, the guiding and sealing assembly includes a lower circular base member or housing 35 having an upper circular cover member 36 threadably attached thereto. Base member 35 is provided with a central opening 37 therethrough to accommodate rod 27. Opening 37 contains an enlarged portion 38 at its upper end to accommodate one or more packing rings 39 which provide a seal around rod 27. A lower retainer ring 40 is provided in enlarged portion 38 underneath the packing rings while an upper retainer ring 41 is provided above the packing rings 39 in the enlarged portion 38 of central opening 37. Upper retainer ring 41 may be secured to base member 35 by suitable means such as bolts 42. Openings or holes 43 are formed in the top of the cover member 36 to provide an outlet for removing any fluid which may leak past the packing material into the space between cover member 36 and retainer ring 41. Cover member 36 further is provided with a central opening 44 to receive the upper end of rod 27.

Figure 4:
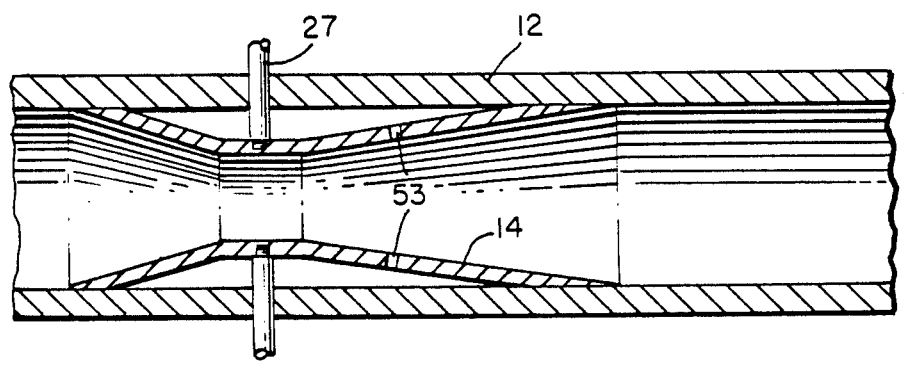
FIG. 4 is a cross-sectional view taken along line 4—4 of FIG. 1.

In the embodiment shown in FIG. 6, the rod 27 is provided at its lower end with a threaded portion or extension 46 which is threadably connected to the venturi flow nozzle 14 at the throat 51 of the nozzle. Rod 27 has a circular lip or ring 47 spaced from the end which is to be connected to the horn 26 whereby the lip 47 provides a safety feature stop for rod 27 by abutting against the upper inner surface of cover member 36. Thus, in case rod 27 should become disconnected at its lower end from nozzle 14, lip 47 would function as a safety stop to prevent the rod from being blown out. The nozzle 14 may be provided with a flattened portion 52 at the point where the bottom end of rod 27 contacts the nozzle. As further shown in FIGS. 4 and 6, the walls of nozzle 14 are provided with a plurality of openings 53 to permit fluid passing through the nozzle to enter the space between the inner wall of pipe 12 and the outer wall of nozzle 14 to equalize the fluid pressure inside and outside of the nozzle.

To install the rod 27, it is inserted through the central opening 37 in base member 35 and threaded portion 46 is threaded into nozzle 14. Cover member 36 is then attached to base member 34 with threaded portion 28 extending therethrough and the horn 26 is then threaded onto threaded portion 28 of rod 27.

Figure 8:
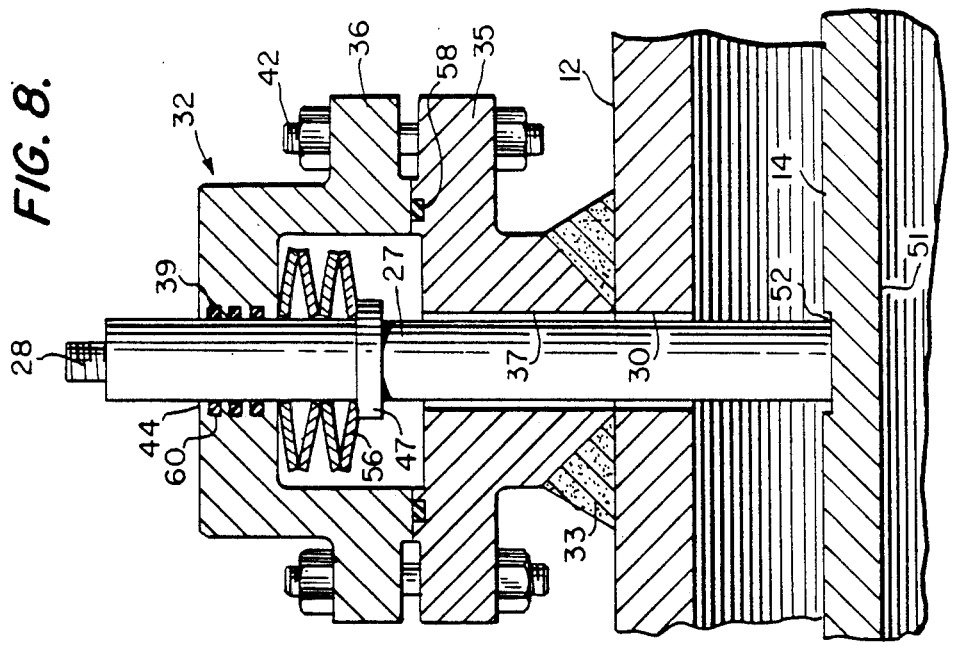
FIG. 8 is a view similar to FIG. 6 showing still another embodiment of the guiding and sealing assembly.
Figure 7:
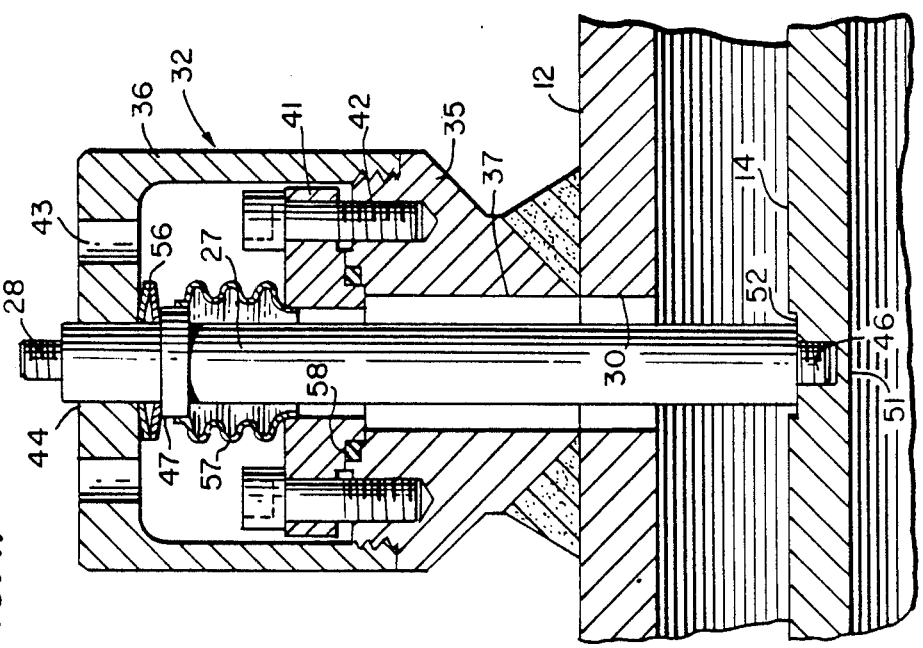
FIG. 7 is a view similar to FIG. 6 showing an alternative embodiment of the guiding and sealing assembly.
Figure 9:
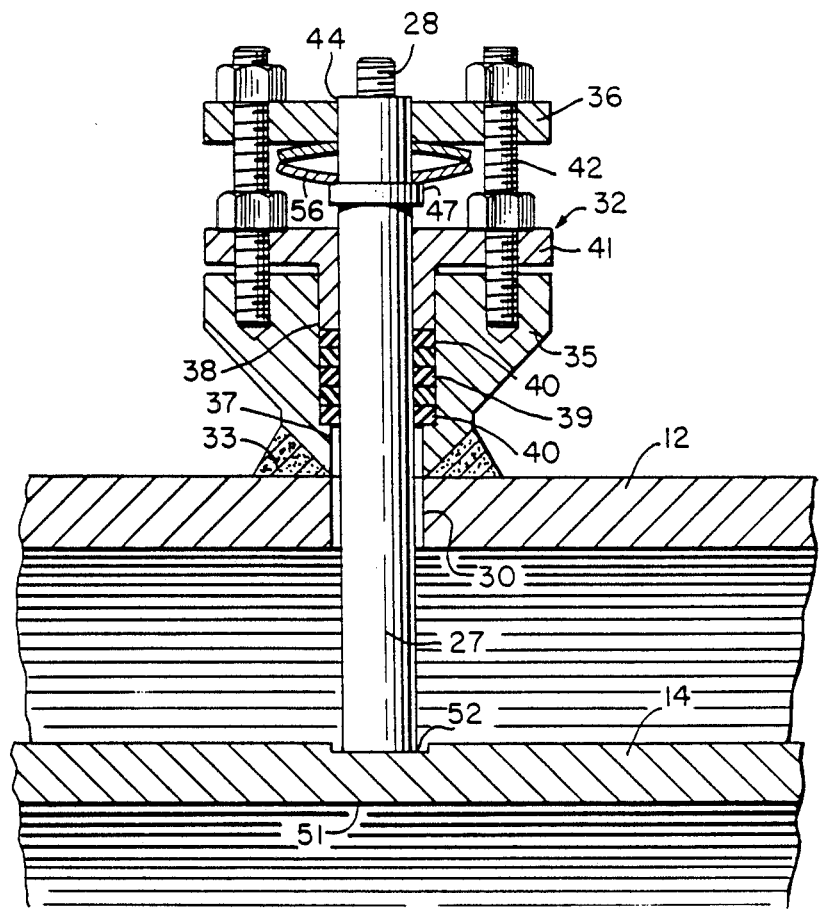
FIG. 9 is a view similar to FIG. 6 showing a further embodiment of the guiding and sealing assembly.

Additional embodiments of the guiding and sealing assembly 32 are shown in FIGS. 7–9. Since many of the parts in these additional embodiments are the same as the parts described in connection with the embodiment of FIG. 6, similar parts in the other embodiments will be designated by the same numerals used in connection with the embodiment shown in FIG. 6.

In the embodiment shown in FIG. 7, the rod 27 is threaded into nozzle 14 at its bottom end and a bellville spring 56 is mounted around the upper portion of the rod positioned between lip 47 and the upper inner surface of cover member 36. Accordingly, spring 56 biases the rod downwardly towards the nozzle 14. In addition, a bellows 57 surrounds rod 27 at its upper end. Bellows 57 is attached at its upper end to lip 47 and at its lower end to the opening in retainer ring 41. A metal O-ring 58 is provided between retainer ring 41 and base member 35. The bellows 57 and the O-ring 58 serve as seals to prevent any fluid from pipe 12 entering into the compartment inside cover member 36. The remaining parts of the embodiment of FIG. 7 function in the same manner as that set forth in connection with the embodiment of FIG. 6.

In the embodiment shown in FIG. 8, the packing rings 39 are located in grooves 60 formed around the periphery of the central opening in cover member 36 to provide a seal against fluid from pipe 12 leaking to the outside. Moreover, in the embodiment of FIG. 8 a pair of bellville springs 56 are employed to bias the rod 27 towards the nozzle 14. In addition, the bottom of the rod 27 forcibly contacts the flattened portion 52 of nozzle 14 rather than being threadably connected thereto. Lip 47 functions as a safety stop in the same manner as that described in connection with the embodiment of FIG. 6. Metal O-ring 58 in this embodiment is positioned directly between base member 35 and cover member 36. Moreover, in this embodiment the bolts 42 directly connect cover member 36 with base member 35.

In the embodiment shown in FIG. 9, cover member 36 is in the form of a flat plate secured around rod 27 by bolts 42 which thread therethrough as well being threaded through retainer ring 41 into base member 35 to secure the assembly together. In this embodiment, retainer rings 40 are positioned both above and below the packing rings 39. Like the embodiment of FIG. 8, the embodiment of FIG. 9 also has rod 27 forcibly contacting flattened portion 52 of nozzle 14 rather than being threadably connected thereto. Rod 27 is biased downwardly towards nozzle 14 by bellville spring 56 mounted around the rod between lip 47 and cover member 36. Lip 47 functions as a safety stop in the same manner as that described in connection with the embodiment of FIG. 6.

Figure 10:
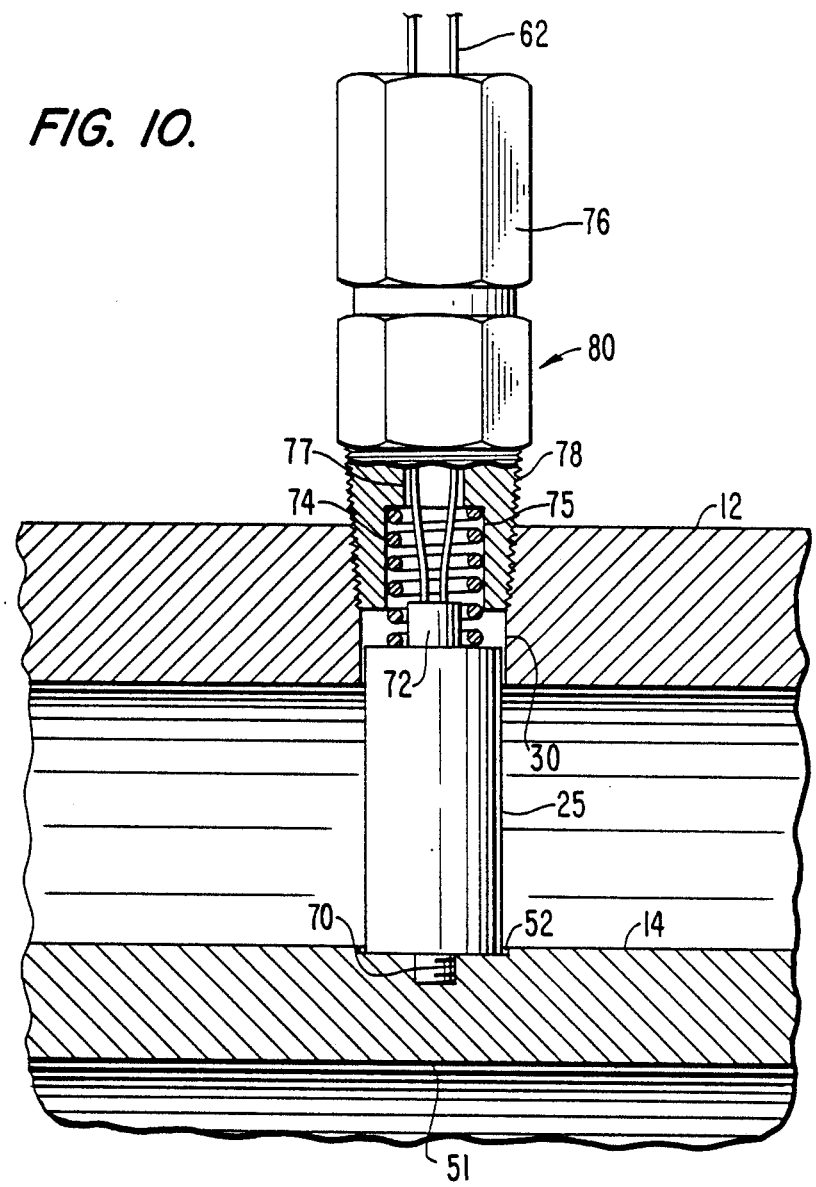
FIG. 10 is a view similar to FIG. 6 showing another embodiment of the ultrasonic cleaning device of the present invention wherein the transducer is mounted inside the pipe adjacent the nozzle.
Figure 11:
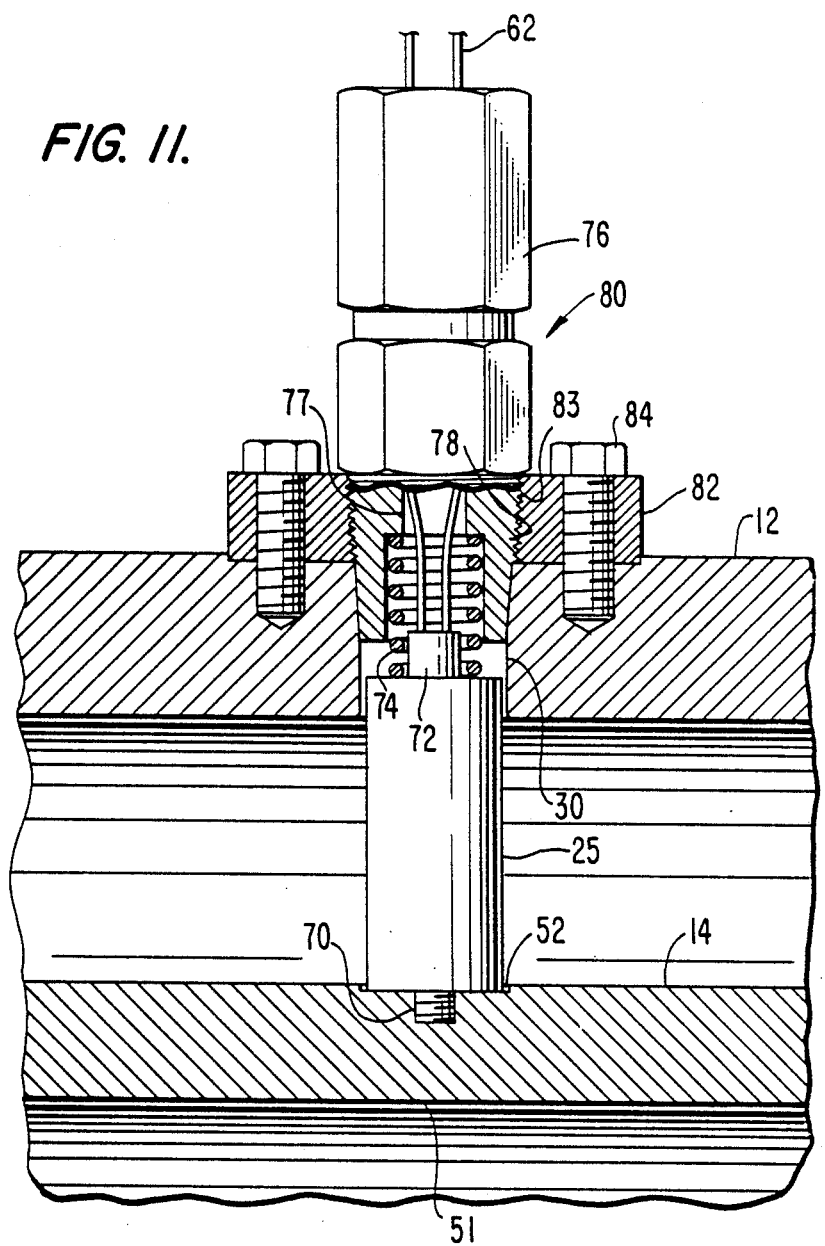
FIG. 11 is a view similar to FIG. 10 showing another embodiment of the mounting and sealing assembly for maintaining the transducer in position inside the pipe adjacent the nozzle.

Additional embodiments of an ultrasonic cleaning device according to the present invention are shown in FIGS. 10 and 11. Since many of the parts in these additional embodiments are the same as parts described in connection with the embodiments of FIGS. 6-9, similar parts in these additional embodiments will be designated by the same numerals used in connection with the emodiment shown in FIGS. 6-9.

In the embodiment of the device shown in FIG. 10, the transducer 25 is inserted through the opening 30 in pipe 12 to the point where the inner end of the transducer is in contact with the nozzle 14 at the throat 51 thereof. The inner end of the transducer may be provided with a threaded portion or screw 70 which is threadably engaged with the nozzle to securely connect the transducer thereto at flattened portion 52 on the outside of the nozzle. The other outer end of the transducer is provided with an extension or rod 72 which is engaged by a hold down or compression spring 74 positioned in a central opening 75 in the inner end of a suitable fitting 76 whereby the spring is compressed between the outer end of opening 75 and the outer end of transducer 25. The spring 74 functions to bias the transducer towards the nozzle. Fitting 76 may be a Conax fitting having a central passageway 77 therethrough to receive suitable electrical connections 62 leading from any suitable power source to the transducer.

The inner end portion 78 of fitting 76 is threaded and tapers outwardly from the inner end to the main body of the fitting. The outer portion of pipe opening 30 is similarly threaded and tapered outwardly to be threadably engaged by the threaded end portion 78 of the fitting. Accordingly, the threaded end portion 78 of fitting 76 seals the pipe opening 30 to prevent any fluid from leaking out through opening 30. The fitting 76, including its associated portions, and spring 74 constitute a mounting and sealing assembly 80 for sealing the pipe opening and for biasing the transducer towards the nozzle.

The embodiment of the device shown in FIG. 11 is similar to the embodiment shown in FIG. 10 but additionally includes a base member 82 having an outwardly tapered threaded central opening 83 therein for threadably engaging tapered end portion 78 of the fitting 76. Base member 82 is fixedly secured to pipe 12 by means of bolts 84. In this embodiment, the inner end portion of fitting 76 is not threaded but is tapered to be snugly received within the outwardly tapered upper portion of pipe opening 30.

Although not shown in the drawings, in both embodiments of FIGS. 10 and 11, the threaded portions 70 at the inner end of the transducer 25 may be eliminated and the transducers biased against the nozzle 14 at flattened portion 52 by the spring 74 to maintain the transducer in position. In that case, it is necessary that the outer ends of the transducers 25 extend a short distance into the inner end of pipe openings 30 to ensure that the transducer is maintained in its proper position. In the embodiment whereby the transducers do include threaded portion 70, however, it is not necessary that the transducer extend into the inner end of the pipe opening 30. Moreover, as in the case with the embodiments of FIGS. 6-9, a plurality of transducers may be employed in connection with each nozzle.

In operation of the cleaning device of the present invention, the cleaning device may be mounted to pipe 12 and venturi nozzle 14 as shown in FIG. 1 or each transducer assembly 22 may be supported solely by each guiding and sealing assembly 32. Power is supplied to the transducers by any suitable source through electrical connections 62. During use, an automatic timer may be employed to actuate the transducers of the cleaning device as desired.

The use of sound waves to prevent fouling in a venturi flow nozzle by preventing deposits from building up is extremely effective. The sound waves create ultrasonic cavitation which scrubs the surface of the inside of the nozzle by means of countless, minute, cavity implosions created in the fluid flowing therethrough. These cavities are not air bubbles which rise to the surface, but rather are tiny voids created and collapsed with the passage of each sound pressure wave. The energy released as each tiny cavity collapses against the surface, results in a powerful, thorough cleaning action which leaves the surface itself completely intact and clean.

The ultrasonic cavitation is produced by generating mechanical vibrations in the transducer elements which then transmit the vibrations as sound waves to the horn which in turn concentrates the sound waves to the rod for effective transmission directly to the venturi flow nozzle.

Figure 5:
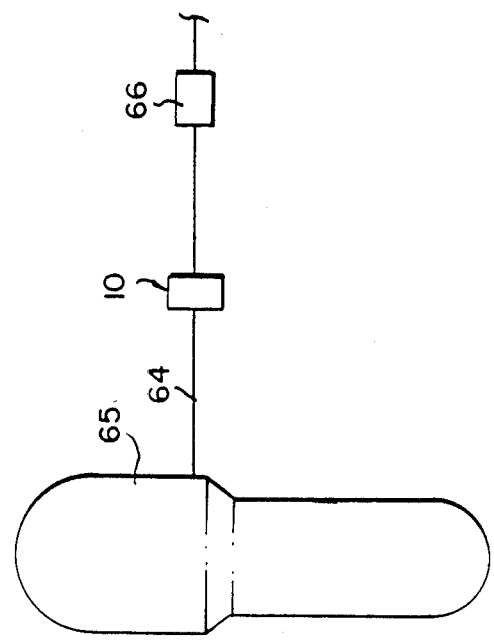
FIG. 5 is a schematic drawing showing the ultrasonic cleaning device installed in the main feedwater pipe leading to a steam generator of a pressurized water nuclear powered electric generating system.

The present invention is useful in many different industries such as the nuclear power industry and the chemical industry. For example, as shown in FIG. 5, the cleaning device 10 may be installed in connection with a flow venturi nozzle located in the main feedwater pipe 64 of a pressurized water nuclear powered electrical generating plant between the steam generator 65 and the main feedwater control valve 66.

It is apparent from the foregoing that many advantageous features are provided by the present invention. Cleaning of the venturi flow nozzles can be done on line and does not require plant shutdown and pipe drainage. The cleaning can be done automatically and does not require manual operation such as that required with jet spraying. The components of the cleaning device are extremely durable and require little if any replacement or spare parts and are essentially maintenance free. In addition, the device is relatively inexpensive when compared to other alternatives, as well as being easy to install.

Numerous alterations and modifications of the structure herein disclosed will suggest themselves to those skilled in the art. It is to be understood, however, that the present disclosure relates to the preferred embodiments of the invention which are for purposes of illustration only and are not to be construed as a limitation of the invention. All such modifications which do not depart from the spirit of the invention are intended to be included within the scope of the appended claims.

We claim as our invention:

1. An ultrasonic cleaning device for a venturi flow nozzle mounted in a pipe in a fluid system comprising:
   a transducer positioned adjacent and abutting said nozzle in said pipe for producing and transmitting sound waves to said nozzle; and
   a mounting and sealing assembly mounted in an opening in said pipe for maintaining said transducer in position adjacent said nozzle and for sealing said opening.

2. The device of claim 1 which includes a plurality of said transducers and said mounting and sealing assemblies mounted around said pipe.

3. The device of claim 1 wherein said transducer includes a threaded portion at one end for connection to said nozzle.

4. The device of claim 1 wherein said mounting and sealing assembly includes a fitting mounted in said opening and spring means for biasing said transducer towards said nozzle.

5. The device of claim 4 wherein said fitting is threadably engaged with at least a portion of said opening.

6. The device of claim 4 wherein said mounting and sealing assembly includes a base member attached to said pipe, said base member having a central opening therein in alignment with said opening in said pipe and wherein at least a portion of said fitting is threadably engaged with said base member.

7. An ultrasonic cleaning device for a venturi flow nozzle mounted in a pipe in a fluid system comprising:
   a transducer positioned adjacent said nozzle in said pipe for producing and transmitting sound waves to said nozzle;
   a mounting and sealing assembly mounted in an opening in said pipe for maintaining said transducer in position adjacent said nozzle and for sealing said opening, said mounting and sealing assembly including a fitting threadably mounted in said opening and spring means for biasing said transducer towards said nozzle; and
   wherein said transducer includes a threaded portion at one end for connection to said nozzle.

8. The device of claim 7 which includes a plurality of said transducers and said mounting and sealing assemblies mounted around said pipe.

9. The device of claim 7 wherein said mounting and sealing assembly includes a base member attached to said pipe, said base member having a central opening therein in alignment with said opening in said pipe and wherein at least a portion of said fitting is threadably engaged with said base member.

10. In a nuclear reactor system having a pipe with a venturi flow nozzle mounted therein, an ultrasonic cleaning device for said nozzle comprising:
    a plurality of transducers positioned adjacent said nozzle in said pipe for producing and transmitting sound waves to said nozzle;
    a mounting and sealing assembly mounted in an opening in said pipe for each said transducer for maintaining each said transducer in position adjacent said nozzle and for sealing said opening, each said mounting and sealing assembly including a fitting threadably mounted in said opening and spring means for biasing said transducer towards said nozzle; and
    wherein each said transducer includes a threaded portion at one end for connection to said nozzle.

11. The device of claim 10 wherein each said mounting and sealing assembly includes a base member attached to said pipe, said base member having a central opening therein in alignment with said opening in said pipe and wherein at least a portion of said fitting is threadably engaged with said base member.

12. An ultrasonic cleaning device for a venturi flow nozzle mounted in a pipe in a fluid system comprising:
    a transducer mounted adjacent said pipe for producing sound waves;
    a rod connected at one end to said transducer and extending through an opening into said pipe so that the other end of said rod contacts said nozzle to transmit said sound waves thereto; and
    a guiding and sealing assembly for said rod attached to said pipe around said pipe opening.

13. The device of claim 12 which includes a horn between said transducer and said one end of said rod to concentrate said sound waves to said rod.

14. The device of claim 12 which includes a cover around said transducer.

15. The device of claim 12 which includes a plurality of said transducers and rods mounted around said pipe for producing and transmitting said sound waves to said nozzle.

16. The device of claim 12 wherein said rod includes a threaded portion at said other end for connection to said nozzle.

17. The device of claim 12 which includes a plate mounted around said pipe for supporting said transducer.

18. The device of claim 12 wherein said guiding and sealing assembly comprises a base member and a cover member, each having a central opening therein through which said rod passes, and sealing means surrounding said rod.

19. The device of claim 18 wherein said guiding and sealing assembly further includes spring means for biasing said rod towards said nozzle.

20. The device of claim 18 wherein said sealing means includes at least one packing ring around said rod in at least one of said central openings.

21. The device of claim 18 wherein said sealing means includes a bellows surrounding said rod.

22. An ultrasonic cleaning device for a venturi flow nozzle mounted in a pipe in a fluid system comprising:
   a transducer mounted adjacent said pipe for producing sound waves;
   a horn attached to said transducer for concentrating said sound waves;
   a rod connected at one end to said horn and extending through an opening into said pipe so that the other end of said rod contacts said nozzle to transmit said sound waves thereto; and
   a guiding and sealing assembly for said rod attached to said pipe around said pipe opening, said assembly comprising a base member and a cover member, each having a central opening therein through which said rod passes, and sealing means surrounding said rod.

23. The device of claim 22 which includes a cover around said transducer.

24. The device of claim 22 which includes a plurality of said transducers, horns and rods mounted around said pipe for producing and transmitting said sound waves to said nozzle.

25. The device of claim 22 wherein said rod includes a threaded portion at said other end for connection to said nozzle.

26. The device of claim 22 which includes a plate mounted around said pipe for supporting said transducers, horns and rods.

27. The device of claim 22 wherein said guiding and sealing assembly further includes spring means for biasing said rod towards said nozzle.

28. The device of claim 22 wherein said sealing means includes at least one packing ring around said rod in at least one of said central openings.

29. The device of claim 22 wherein said sealing means includes a bellows surrounding said rod.

30. In a nuclear reactor system having a pipe with a venturi flow nozzle mounted therein, an ultrasonic cleaning device for said nozzle comprising:
   a plurality of transducer assemblies mounted around said pipe for producing and transmitting sound waves to said nozzle;
   each said transducer assembly including a transducer for producing sound waves, a horn attached to said transducer for concentrating said sound waves and a rod connected at one end to said horn and extending through an opening into said pipe so that the other end of said rod contacts said nozzle to transmit said sound waves thereto; and
   a guiding and sealing assembly for each said rod attached to said pipe around each said pipe opening, each said assembly comprising a base member and a cover member, each having a central opening therein through which said rod passes, and sealing means surrounding said rod.

31. The device of claim 30 wherein each said guiding and sealing assembly further includes spring means for biasing said rod towards said nozzle.

32. The device of claim 30 wherein each transducer assembly further includes a cover around each transducer.

* * * * *